United States Patent
Eipper

(10) Patent No.: US 6,702,169 B2
(45) Date of Patent: Mar. 9, 2004

(54) DETACHABLE CONTAINER ON A VEHICLE

(75) Inventor: Konrad Eipper, Rottenberg (DE)

(73) Assignee: DaimlerChrysler AG, Stuttgart (DE)

( * ) Notice: Subject to any disclaimer, the term of this patent is extended or adjusted under 35 U.S.C. 154(b) by 112 days.

(21) Appl. No.: 09/978,780

(22) Filed: Oct. 18, 2001

(65) Prior Publication Data

US 2002/0053582 A1 May 9, 2002

(30) Foreign Application Priority Data

Oct. 18, 2000 (DE) .......................................... 100 51 666

(51) Int. Cl.$^7$ .................................................. A45F 4/00
(52) U.S. Cl. ..................... 224/585; 224/543; 224/547; 224/549; 224/563; 224/569; 70/63; 70/64
(58) Field of Search ................................ 224/585, 584, 224/539, 542, 543, 544, 547, 549, 557, 563, 569, 311, 314, 315, 318, 328; 70/63, 64

(56) References Cited

U.S. PATENT DOCUMENTS

| | | | | |
|---|---|---|---|---|
| 338,846 A | * | 3/1886 | Kimber | 190/101 |
| 924,824 A | * | 6/1909 | Peebler | 70/15 |
| 1,432,589 A | * | 10/1922 | Brazeau | 211/7 |
| 2,159,279 A | * | 5/1939 | Lipowsky et al. | 383/22 |
| 2,416,497 A | * | 2/1947 | Rodger | 70/63 |
| 4,260,091 A | * | 4/1981 | French et al. | 224/311 |
| 4,733,549 A | * | 3/1988 | Baker | 70/68 |
| 5,542,590 A | * | 8/1996 | Pfitzenmaier | 224/275 |
| 6,026,646 A | * | 2/2000 | Hansen et al. | 62/3.6 |
| 6,070,775 A | * | 6/2000 | Tolley et al. | 224/404 |
| 6,155,715 A | * | 12/2000 | Lake et al. | 383/6 |
| 6,332,713 B1 | * | 12/2001 | Cohen | 383/75 |
| 6,349,575 B1 | * | 2/2002 | Bentley | 70/18 |
| 6,349,865 B1 | * | 2/2002 | Tolley et al. | 224/404 |
| 6,354,104 B1 | * | 3/2002 | Feagin | 62/457.1 |
| 6,394,327 B1 | * | 5/2002 | Mietlicki | 224/547 |
| 6,463,771 B1 | * | 10/2002 | Judge | 70/68 |
| 6,494,352 B1 | * | 12/2002 | Mullen | 224/524 |
| 6,604,390 B1 | * | 8/2003 | Nooner | 70/63 |

FOREIGN PATENT DOCUMENTS

| | | |
|---|---|---|
| DE | 29 16 038 | 4/1979 |
| DE | 8509818 | 4/1985 |
| DE | 37 30 459 | 9/1987 |
| DE | 8900151 | 1/1989 |
| DE | 44 41 842 | 11/1994 |
| GB | 2031375 | 4/1980 |

* cited by examiner

Primary Examiner—Stephen K. Cronin
(74) Attorney, Agent, or Firm—Crowell & Moring LLP

(57) ABSTRACT

A container that can be locked and fastened to a vehicle with lockable fastening devices in a detachable manner, made of material impenetrable toward gaining unauthorized access to the contents, is designed in such a way that it can be carried as a bag in the detached state and stored on the vehicle side in the empty state in a space-saving and aesthetically appealing manner. For this purpose, the container is made of a collapsible material and designed like a bag.

12 Claims, 1 Drawing Sheet

DETACHABLE CONTAINER ON A VEHICLE

BACKGROUND AND SUMMARY OF THE INVENTION

This application claims the priority of German Patent Document 100 51 666.1, filed in Germany Oct. 18, 2000.

The invention relates to a container that is fastened to a vehicle in a detachable manner. Preferred embodiments of the invention relate to a container that can be locked and fastened to a vehicle with lockable fastening devices in a detachable manner, made of material impenetrable toward gaining unauthorized access to the contents.

Such a container, made of rigid material in the form of a metal box, has been known as a container for valuables in motor vehicles from German Patent Document No. DE 2916038 A1.

A collapsible container in the design of a folding bag, which can be fastened within the vehicle as a storage container for parts, is shown in German Patent Document No. DE 8509818 U.

German Patent Document No. DE 3730459 A1 describes a container made of flexible material in the design of a bag that can be fastened in the interior of a vehicle in a detachable manner.

Cut-resistant folding materials are known from German Patent Document No. DE 4441842 A1 with regard to motor vehicle parts and from German Patent Document No. DE 8900151 U with regard to containers in the design of bags.

The invention relates to the problem of incorporating within a motor vehicle, particularly in its passenger compartment, a theft-proof container that can be fastened to the vehicle body in a detachable manner and is secured against unauthorized opening with appropriate material and an appropriate opening mechanism, which in the empty state is stored in a space-saving and aesthetically appealing manner. Furthermore the container should be able to be filled also in the fastened state, wherein in this state, it should take up a larger storage area than in the empty state, however by being stored as inconspicuously as possible in vehicle parts used for other purposes and/or on the vehicle body itself.

This problem is solved according to preferred embodiments of the invention by providing a container that can be locked and fastened to a vehicle with lockable fastening devices in a detachable manner, made of material impenetrable toward gaining unauthorized access to the contents, wherein the container is designed as a bag and that the impenetrable material is foldable.

Beneficial and useful embodiments are described below and in the claims.

The invention is based on the general idea of designing a theft-proof impenetrable container made of foldable material in the form of a collapsing, lockable bag, which is stored as inconspicuously as possible within the interior of a motor vehicle and connected with the vehicle in a theft-proof manner. When detached from the vehicle, the container can be handled like a regular bag and is designed with appropriate carrying handles for this purpose in the usual bag-like manner. The closure of the container itself as well as the fastener to the vehicle can beneficially be provided as uniform closure devices that fulfill both purposes.

The coverage means, with which the collapsing container is covered in the empty state within the vehicle, can be linked to the vehicle side in a swiveling manner. These means can have the form of a flap, which in itself is collapsible again, in order to be able to reach e.g. around the container from above at an angle when it is fastened above the container, which is attached to the vehicle side. The coverage means are beneficially integrated in the inside molding of a motor vehicle, i.e. are a component of it.

Other objects, advantages and novel features of the present invention will become apparent from the following detailed description of the invention when considered in conjunction with the accompanying drawings.

DETAILED DESCRIPTION OF THE DRAWINGS

Figure 1:
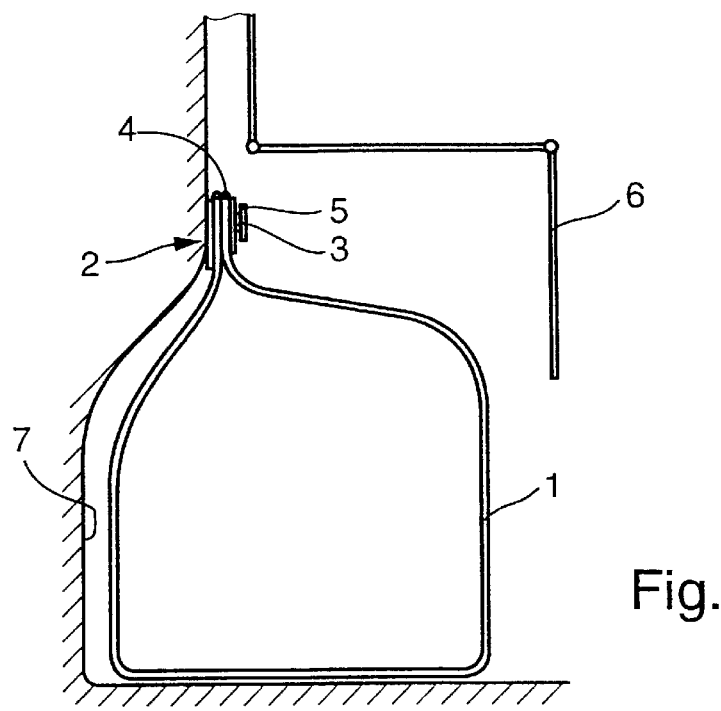
FIG. 1 is a side view of a container in the filled state that has been attached to a sidewall of the vehicle and locked, constructed according to a preferred embodiment of the invention.

A container 1, designed as a collapsible bag and locked to prevent removal, is fastened with detachable fastening devices 2 to the interior side of a motor vehicle's sidewall 7. On the vehicle side, the closure devices 2 consist of a fastener 3 that contains an opening and onto which the upper closure strap 4 of the container 1 can be slid via these openings. Furthermore, these closure devices 2 include a lock 5, which can be inserted in the fastener 3. Especially the lock 5 can of course be integrated into the container 1 in an aesthetically appealing way, especially in the closure straps 4.

The foldable material of the container 1 consists of cut-resistant fiber material or other impenetrable, foldable material. Preferred embodiments utilize aramide fiber material as the cut-resistant fiber material. A container 1 made of such a material and designed as a detachable bag additionally exhibits the advantage that this bag is also secured against unauthorized access to the contents when carried by a person. Closure devices 2 that are provided directly on the container 1 allow it also to be locked safely against removal when stored outside the vehicle on stationary parts while using it as a bag, e.g. with an additionally provided chain, which can also be attached if necessary separately as a transportable component.

The storage position can be located on a vehicle sidewall 7 beneath a swiveling coverage device 6, designed as a flap. This coverage device 6 is linked to the sidewall 7 in a swiveling manner and beyond that can also be collapsed in itself parallel to the axis. This allows the coverage device 6 to wrap itself from above at an angle around a filled container 1 that has been fastened to the vehicle sidewall 7.

Figure 2:
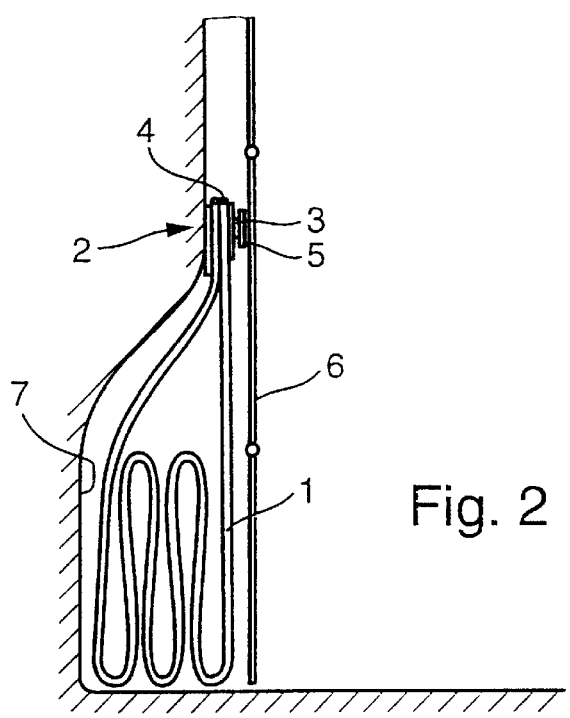
FIG. 2 shows the container of FIG. 1 in an empty, covered state.

In the empty state the container 1 can be folded like an accordion in the direction of its sidewalls, as shown in FIG. 2. In this state, the container 1 is completely covered by the coverage devices 6. When designing the coverage device 6 as part of the inside molding of the passenger compartment area, an empty container 1 is practically invisible and/or at any rate can be stored in an extremely inconspicuous manner within the passenger compartment.

Possible storage positions, apart from those on a vehicle sidewall 7, are e.g. the vehicle floor or particularly areas in or on the vehicle seats. It is also possible to store the invented container in doors and already existing flaps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A container that can be locked and fastened to a vehicle with a locking device and a fastening device in a detachable manner, made of material impenetrable toward gaining unauthorized access to contents of the container, wherein the container is designed as a bag and that the impenetrable material is foldable.

2. Container pursuant to claim 1, wherein the container is covered in a storage position within the vehicle in a collapsed state by a coverage device that is fastened to a vehicle side.

3. Container pursuant to claim 2, wherein the coverage device on the vehicle side is a flap that is linked to the vehicle side in a swiveling manner.

4. Container pursuant to claim 3, wherein the flap additionally can be collapsed in itself parallel to a vehicle side swivel axis.

5. A stowage assembly for stowing objects in a vehicle, said stowage assembly comprising:
    a bag constructed of foldable impenetrable material and having an upper closure strap defining an opening; and
    a locking assembly disposed on said upper closure strap and operable to lockingly close said opening and lock the bag to fixed vehicle structure.

6. The stowage assembly according to claim 5 wherein the locking assembly is integrated into the upper closure strap.

7. A stowage assembly according to claim 5, wherein said impenetrable material is cut-resistant fiber material.

8. A stowage assembly according to claim 7, wherein said impenetrable material is aramide fiber material.

9. A passenger vehicle comprising:
    an interior space bounded by fixed vehicle structure,
    a bag constructed of foldable impenetrable material and having an upper closure strap defining an opening; and
    a locking assembly disposed on said upper closure strap and operable to lockingly close said opening and lock the bag to said fixed vehicle structure.

10. A vehicle according to claim 9, wherein said impenetrable material is cut-resistant fiber material.

11. The passenger vehicle according to claim 9 wherein the locking assembly is integrated into the upper closure strap.

12. The passenger vehicle according to claim 9 wherein the locking assembly is included in a fastener attached to said fixed vehicle structure.

* * * * *